United States Patent [19]
Shiraishi

[11] Patent Number: 5,905,662
[45] Date of Patent: May 18, 1999

[54] DIGITAL PROCESSING SYSTEM FOR BINARY ADDITION/SUBTRACTION

[75] Inventor: Mikio Shiraishi, Yokohama, Japan

[73] Assignee: Kabushiki Kaisha Toshiba, Kawasaki, Japan

[21] Appl. No.: 08/927,210

[22] Filed: Sep. 11, 1997

[30] Foreign Application Priority Data

Sep. 13, 1996 [JP] Japan ................................. 8-243296

[51] Int. Cl.$^6$ ................................................. G06F 7/38
[52] U.S. Cl. ..................................................... 364/745.03
[58] Field of Search ........................ 364/745.03, 748.04, 364/737

[56] References Cited

U.S. PATENT DOCUMENTS

| | | | |
|---|---|---|---|
| 4,722,066 | 1/1988 | Armer et al. | 364/745.03 |
| 4,779,220 | 10/1988 | Nukiyama | 364/748.04 |
| 4,796,218 | 1/1989 | Tamaka et al. | 364/748.04 |
| 5,260,890 | 11/1993 | Suzuki | 364/737 |
| 5,369,438 | 11/1994 | Kim | 364/745.03 |
| 5,774,829 | 6/1998 | Cisneros et al. | 701/213 |

FOREIGN PATENT DOCUMENTS

| | | |
|---|---|---|
| 3-244023 | 10/1991 | Japan . |
| 6-202850 | 7/1994 | Japan . |
| H7-210368 | 8/1995 | Japan . |

*Primary Examiner*—Tan V. Mai
*Attorney, Agent, or Firm*—Banner & Witcoff, Ltd.

[57] ABSTRACT

A digital processing system for binary addition/subtraction includes an adder for adding two binary data respectively expressed by two's complements to output the addition result, an overflow carry detector for outputting an overflow carry signal indicating an overflow carry of the addition result, an exclusive OR gate for outputting the sign bit of the addition result of the adder with or without inversion, and a register for storing the output from the exclusive OR gate.

21 Claims, 5 Drawing Sheets

FIG. 1

| DECODER INPUT | | DECODER OUTPUT | | |
|---|---|---|---|---|
| g | h | d0 | d1 | c |
| 0 | 0 | 0 | 0 | 0 |
| 0 | 1 | 0 | 1 | 0 |
| 1 | 0 | 1 | 1 | 0 |
| 1 | 1 | 1 | 1 | 1 |

| d0 | d1 | c | X | Y | Z | m |
|----|----|---|------|------|------|---|
| 0  | 0  | 0 | 0111 | 0110 | 0111 | 0 |
| 0  | 1  | 0 | 0111 | 0110 | 1101 | 1 |
| 1  | 1  | 0 | 0111 | 0110 | 0000 | 0 |
| 1  | 1  | 1 | 0111 | 0110 | 0001 | 0 |

FIG. 9

DIGITAL PROCESSING SYSTEM FOR BINARY ADDITION/SUBTRACTION

BACKGROUND OF THE INVENTION

The present invention relates to an arithmetic logic unit (ALU) such as a microprocessor or a digital signal processor (DSP) and, more particularly, to a processor having a circuit for generating a status signal of an arithmetic operation which is internally executed.

When binary addition/subtraction is performed, a conventional ALU directly uses sign bit Zs of arithmetic operation result Z as a sign flag representing the sign of arithmetic operation result Z.

Since an arithmetic operation is executed with a finite word length, an overflow carry may generate. If this overflow carry is generated, an adder outputs an incorrect arithmetic operation result, and a register which stores the arithmetic operation result also stores the incorrect sign flag.

This state (storage of the incorrect sign flag) can be avoided by detecting an overflow carry, and generating an overflow carry flag to indicate that the arithmetic operation result is incorrect.

This method, however, has the following two problems.

First, the arithmetic operation amount increases in an arithmetic operation which may generate an overflow carry because overflow carry detection must be executed every arithmetic operation. This typically occurs in a case requiring only the sigh of the arithmetic operation result. A descriptive example by the assembly language in this case is given as follows.

[Descriptive Example 1]

| | | |
|---|---|---|
| LOOP1:LOAD ACC, X; load X into accumulator | (1) |
| ADD ACC, Y; add X and Y | (1) |
| JUMPV EXIT1; detect overflow carry | (1) |
| LOOP2:JUMPM EXIT2; detect sign | (1) |
| JUMP LOOP1; repeat | (2) |

In Descriptive Example 1, the number in parentheses at the end of each line represents the number of machine cycle necessary to complete the processing. In this example, the line of overflow carry detection (1 cycle) is additionally inserted before sign detection. Compared to the absence of an overflow carry (five machine cycles), the arithmetic operation amount increases by one cycle, i.e., 100×(⅕)= 20%.

Second, exceptional processing is complicated. Restoring the arithmetic operation result upon overflow carry generation to a correct result requires "exceptional processing" of adding a correct sign bit to the head of the most significant bit of addition output Z from an adder. To adjust the restored result within a predetermined number of bits, the entire result must be shifted to the right by one bit (when an overflow carry is generated on the left side of the bit string).

In a conventional processor, since the sign flag upon overflow carry generation is incorrect, and a shift with the sign flag cannot be performed in a shift operation, exceptional processing consumes a long time. That is, after the sign of the result is changed to a correct value, this value is stored again in a shiftable flag (normally, carry flag), which is shifted to the right together with the arithmetic operation result. A descriptive example by the assembly language in this case is given as follows.

[Descriptive Example 2]

| | | |
|---|---|---|
| EXIT1: | LOAD B, ACC;save arithmetic operation result | (1) |
| | NOT ACC;invert arithmetic operation result | (1) |
| | SFLC ACC;transfer sign to carry flag | (1) |
| | LOAD ACC, B;load saved arithmetic operation result | (1) |
| | SFRC ACC;restore result | (1) |
| | JUMP LOOP2;end | (2) |

Also in Descriptive Example 2, the number in parentheses at the end of each line represents the number of machine cycle necessary to complete the processing. In Descriptive Example 2, the total number of machine cycles is seven. (Although Descriptive Example 2 uses a label name common to Descriptive Example 1 for descriptive convenience, Descriptive Example 2 is a general example, and is not directly related to Descriptive Example 1.)

In this manner, in the conventional ALU, the arithmetic operation amount increases in an arithmetic operation which may generate an overflow carry because overflow carry detection must be executed every arithmetic operation. In addition, exceptional processing is complicated.

BRIEF SUMMARY OF THE INVENTION

It is an object of the present invention to provide a digital processing system for binary addition/subtraction which outputs a sign flag representing a correct sign of the arithmetic operation result even when an overflow carry is generated.

To achieve the above object, according to the present invention, there is provided a digital processing system comprising a first register for storing first binary data constituted by a plurality of bits having a first sign bit, and outputting the first binary data;

a selective inverter for directly outputting second binary data constituted by a plurality of bits having a second sign bit, or inverting levels of all bits of the second binary data to supply third binary data which corresponds to the second binary data and is constituted by a plurality of bits having a third sign bit corresponding to the second sign bit;

an adder for adding the first binary data from the first register and the second binary data from the selective inverter so as to output an addition result constituted by a plurality of bits having a fourth sign bit;

an overflow carry detector, connected to the first register, the selective inverter, and the adder, for outputting an overflow carry signal indicating an overflow carry of the addition result on the basis of contents of the first, second, and third sign bits; and a sign flag output circuit, connected to the overflow carry detector, for outputting a sign flag with or without inverting the fourth sign bit of the addition result, in accordance with contents of the overflow carry signal.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
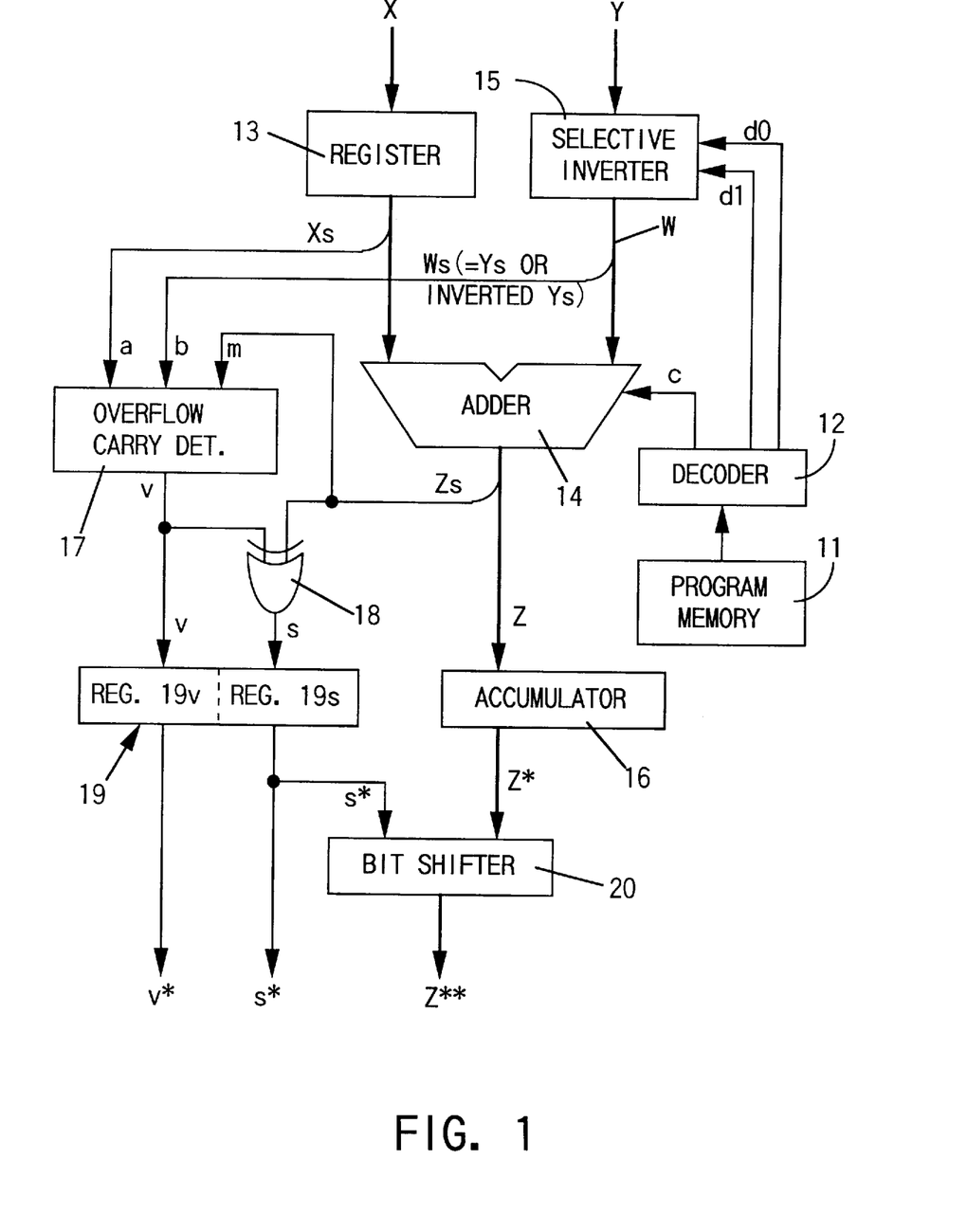
FIG. 1 is a block diagram showing the internal arrangement (ALU and its peripheral portion) of a processor according to an embodiment of the present invention.

FIG. 1 is a block diagram showing the internal arrangement of a digital processing system for binary addition/subtraction according to the present invention.

In FIG. 1, program memory 11 stores a predetermined arithmetic operation procedure as a program. The program read out from program memory 11 is decoded into various instructions by instruction decoder (DEC) 12.

Program memory 11 stores program codes such as the assembler programs of Descriptive Examples 1 and 2 described above.

Figure 2:
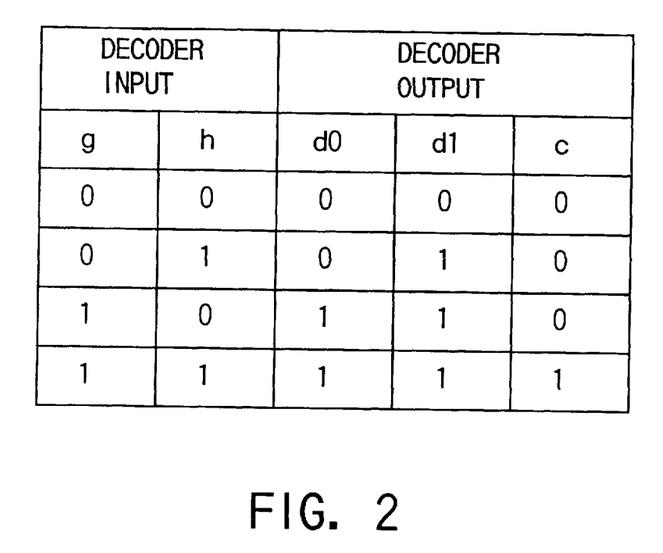
FIG. 2 is a table for explaining the input/output relationship of decoder 12 in the arrangement of FIG. 1.

Assume that a 2-bit code (g, h) is generated as the result of executing predetermined processing by the above program. In this case, decoder 12 outputs a 3-bit code (d0, d1, c) like the one shown in FIG. 2 in accordance with the contents of the execution result (g, h).

Storage circuit (register) 13 receives one binary data X of binary data X and Y with two codes expressed by two's complements. An output from register 3 is supplied to one input terminal of adder 14.

Inverter 15 receives the other binary data Y of two binary data X and Y and supplies an output to the other input terminal of adder 14.

Inverter 15 receives part (d0, d1) of the output from instruction decoder 12. Inverter 15 is constituted to select, on the basis of the contents of the decoder output (instruction), one of three output states, i.e., a state wherein binary data Y is output without any change (W=Y), a state wherein binary data Y is output while inverting respective bits (W=inverted Y or /Y), and a state wherein no signal is output (W=0).

The remaining part (c) of the output from instruction decoder 12 is input as carry signal c to the carry input terminal of adder 14.

Adder 14 outputs sum Z of binary data X and Y on the basis of binary data X output from register 13, binary data W output from inverter 15, and carry signal c output from decoder 12. This sum Z is input to accumulator (ACC) 16. Accumulator 16 temporarily stores this sum Z, and outputs it as binary data Z*.

Overflow carry detector 17 receives signal a (Xs) as the most significant bit (MSB) signal of output X from register 13, signal b (Ws=Ys or /Ys) as the most significant bit signal of output W (=Y or /Y) from inverter 15, and signal m (Zs) as the most significant bit signal of sum Z output from adder 14. Overflow carry detector 17 outputs overflow carry signal v on the basis of these input signals a, b, and m.

The functions of adder 14 and overflow carry detector 17 are realized as the internal ALU of a CPU or a DSP.

Overflow carry signal v and signal m (Zs) as the most significant bit signal of sum Z are input to exclusive OR gate 18. This exclusive OR gate 18 constitutes inverter 18 for selectively inverting or noninverting the logic level of signal m in accordance with the logic level of overflow carry signal v, and outputting a signal.

That is, inverter 18 outputs the inverted signal of m as absolute sign s when an overflow carry is generated, and overflow carry signal v is valid (v=1), and outputs a signal identical to m as absolute sign s when overflow carry signal v is invalid (v=0).

Overflow carry signal v and absolute sign s are input to storage circuit 19 including two registers 19v and 19s. Register 19v temporarily stores overflow carry signal v, and outputs overflow carry flag v*. Register 19s temporarily stores absolute sign s, and outputs absolute sign flag s*. Flags v* and s* output in this manner are used in the following arithmetic processing.

Flag s* output from storage circuit 19, and sum Z* output from accumulator 16 are input to bit shifter 20. Bit shifter 20 properly performs right bit shift processing in accordance with the state (contents) of flag s*, and output sum Z** upon a shift.

Figure 3:
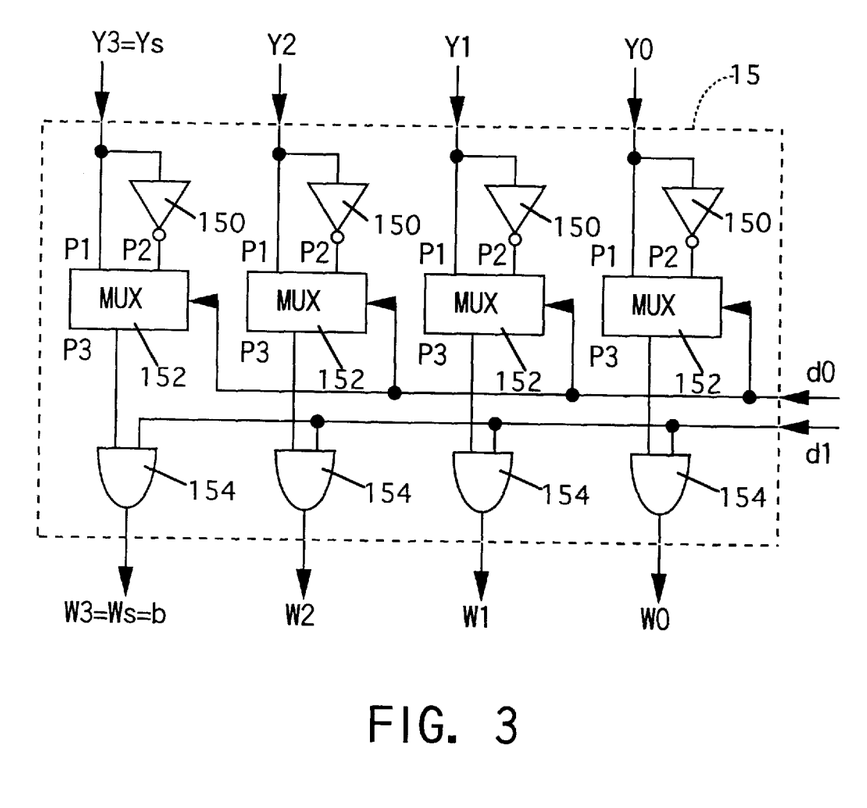
FIG. 3 is a circuit diagram showing a detailed example of inverter 15 in the arrangement of FIG. 1.

Inverter 15 in FIG. 1 can be realized by a circuit like the one shown in FIG. 3. Assume that input data Y is expressed by four bit data Y0 to Y3, and the most significant bit Y3 is sign bit Ys of data Y.

Data bits Y0 to Y3 are respectively supplied to input terminals P1 of circuit blocks MUX 152. Data bits Y0 to Y3 are also supplied to input terminals P2 of circuit blocks MUX 152 through inverters 150.

The operations of circuit blocks MUX 152 for respective data bits Y0 to Y3 are controlled in accordance with the contents of data bit d0 from decoder 12, and details will be described below with reference to FIG. 4. More specifically, data W obtained from output terminal P3 of inverter 15 is identical to input data Y when data bit d0 from decoder 12 represents "0", and output data W is inverted data /Y of input data Y when data bit d0 represents "1".

Each of outputs (corresponding to four bits) from circuit blocks MUX 152 for data bits Y0 to Y3 is supplied to one input of each AND gate 154. Data bit d1 from decoder 12 is supplied to the other input of AND gate 154.

AND gates 154 corresponding to four bits become "through" (open) when data bit d1 is at logic level "1", and supply outputs from circuit blocks MUX 152 for data bits Y0 to Y3 as data W0 to W3.

AND gates 154 corresponding to four bits is "closed" when data bit d1 is at logic level "0", and all data W0 to W3 become 0 (i.e., circuit 15 does not output any information of input data Y).

These four bit data W0 to W3 serve as output W from inverter 15. Of these four bit data W0 to W3, the most significant bit W3 serves as sign bit Ws (=b).

Figure 4:
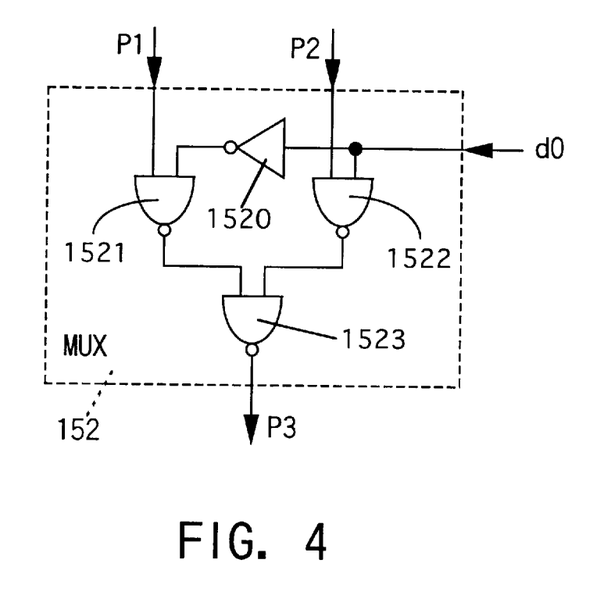
FIG. 4 is a circuit diagram showing a detailed example of circuit block (MUX) 152 in the arrangement of FIG. 3.

Circuit block MUX 152 in FIG. 3 can be realized by a circuit like the one shown in FIG. 4. That is, terminal P1 which receives each bit (Y0 to Y3) of input data Y corresponds to the first input of NAND gate 1521. Terminal P2 which receives bit data obtained by inverting the level of each bit (Y0 to Y3) of input data Y by inverter 150 in FIG. 3 corresponds to the first input of NAND gate 1522.

The second input of NAND gate 1522 receives data bit d0 from decoder 12. A bit obtained by inverting the level of this data bit d0 by inverter 1520 is supplied to the second input of NAND gate 1521. Outputs from NAND gates 1521 and 1522 are input to NAND gate 1523. An output from NAND gate 1523 is lead to output terminal P3 of circuit block MUX 152.

Circuit block MUX 152 in FIG. 4 operates as follows.

When data bit d0 from decoder 12 represents "0", NAND gate 1521 becomes "through", and NAND gate 1522 is "closed". Then, the output level of NAND gate 1522 changes to be always level "1", and NAND gate 1523 becomes "through" for a signal from NAND gate 1521. In this case, NAND gates 1521 and 1523 operate as two series inverters. As a result, the input logic level of NAND gate 1521 becomes the same as the output logic level of NAND gate 1523 (P3=P1). That is, W0 to W3=Y0 to Y3 (or W=Y) holds.

When data bit d0 from decoder 12 represents "1", NAND gate 1521 is "closed", and NAND gate 1522 becomes "through". Then, the output level of NAND gate 1521 changes to be always level "1", and NAND gate 1523 becomes "through" for a signal from NAND gate 1522. In this case, NAND gates 1522 and 1523 operate as two series inverters. Consequently, the input logic level of NAND gate 1522 becomes the same as the output logic level of NAND gate 1523 (P3=P2).

In the circuit configuration of FIG. 3, the logic level of terminal P2 is the same as the inverted level of the logic level of terminal P1 by inverter 150. If /P1 represents the inverted logic level of terminal P1, P3=P2= /P1 is established for d0=1. That is, W0 to W3= /Y0 to /Y3 (or W= /Y) holds.

In accordance with a combination of data bits d0 and d1 from decoder 12, inverter 15 having the arrangement shown in FIGS. 3 and 4 adopts the following operation states:

(1) when d0=0, and d1=1, W0 to W3=Y0 to Y3 (i.e., W=Y);

(2) when d0=1, d1=1, W0 to W3=inverted Y0 to inverted Y3 (i.e., W= /Y); and (3) when d1=0 regardless of d0=0 or 1, W0 to W3=0 to 0 (i.e., W=0, or no output W).

Figure 5:
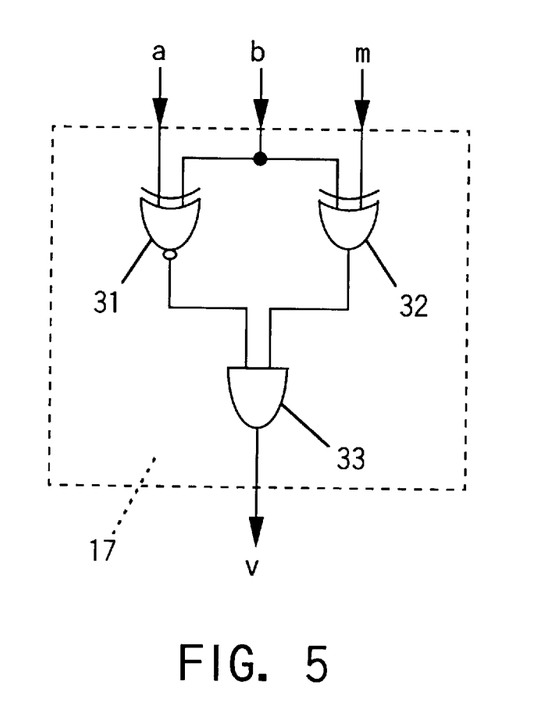
FIG. 5 is a circuit diagram showing a detailed example of overflow carry detector 17 in the arrangement of FIG. 1.

FIG. 5 shows a detailed circuit example of overflow carry detector 17 used in the processor of FIG. 1. This overflow carry detector 17 is constituted by exclusive NOR gate (coincidence detection circuit) 31 which receives signals a (=Xs) and b (=Ys), exclusive OR gate (noncoincidence detection circuit) 32 which receives signals b (=Ws) and m (=Zs), and AND gate 33 which receives outputs from exclusive NOR gate 31 and exclusive OR gate 32.

In this overflow carry detector 17, exclusive NOR gate (coincidence detection circuit) 31 detects coincidence between signals a and b (a=b or Xs=Ws) (at this time, the output level of gate 31 is "1"), and exclusive OR gate (noncoincidence detection circuit) 32 detects noncoincidence between signals b and m (Ws≠Zs) (at this time, the output level of gate 32 is "1"). When both the two states of coincidence (Xs=Ws) and noncoincidence (b≠m or Ws≠Zs) are detected, overflow carry signal v output from AND gate 33 changes to "1".

Figure 6:
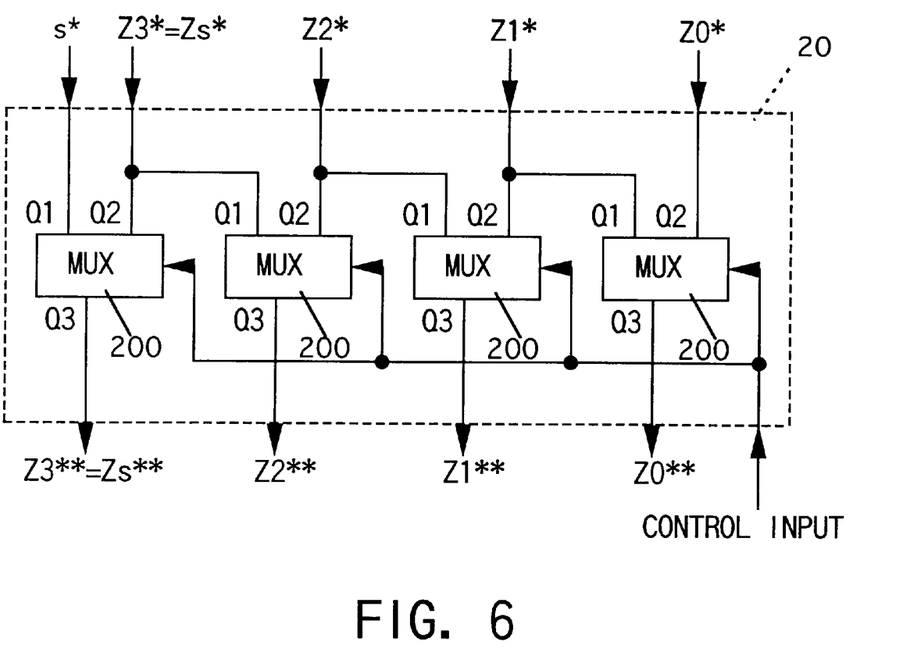
FIG. 6 is a circuit diagram showing a detailed example of bit shifter 20 in the arrangement of FIG. 1.

Bit shifter 20 in FIG. 1 can be realized by a circuit like the one shown in FIG. 6. Assume that input data Z* is given by four bit data Z0* to Z3*, and the most significant bit Z3* is sign bit Zs* of data Z*.

Data bits Z1* to Z3* and absolute sign flag s* are respectively supplied to input terminals Q1 of circuit blocks MUX 200. Data bits Z0* to Z3* are respectively supplied to input terminals Q2 of circuit blocks MUX 200.

The operations of circuit blocks MUX 200 for data bits Z1* to Z3* are controlled in accordance with the content of a predetermined control input, and details will be described below with reference to FIG. 7.

More specifically, when the control input represents "0" (no overflow carry is generated), output data Z from bit shifter 20** is identical to arithmetic operation result data Z* (Z0* to Z3*) output from accumulator 16.

When the control input represents "1" (an overflow carry is generated), output data Z** is data in which the most significant bit of arithmetic operation result data Z* has the contents of sign bit Zs*, and lower bits are data bits Z3* to Z1*.

As the control input, a control signal corresponding to data bit (overflow carry flag) v* from register 19v in FIG. 1, or the contents of this data bit v* can be used.

Figure 7:
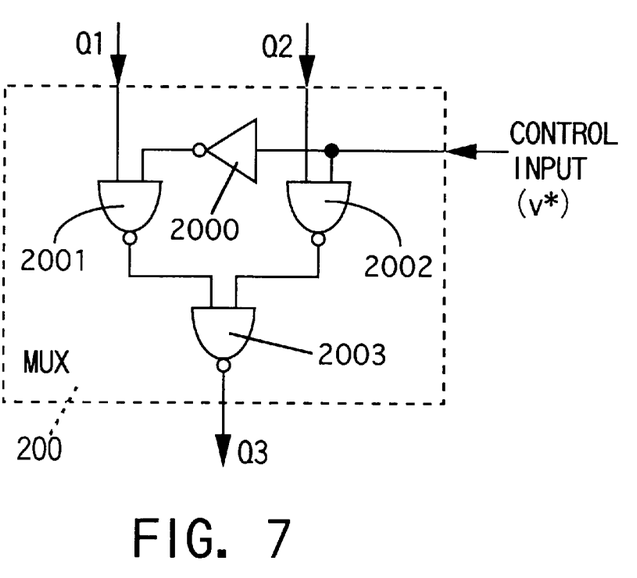
FIG. 7 is a circuit diagram showing a detailed example of circuit block (MUX) 200 in the arrangement of FIG. 6.

Circuit block (MUX) 200 in FIG. 6 can be realized by a circuit like the one shown in FIG. 7. (Assume that overflow carry flag v* is used as the control input in FIG. 6).

More specifically, terminal Q1 which receives absolute sign flag s* and three higher bits (Z3* to Z1*) of 4-bit input data Z* is connected to the first input of NAND gate 2002. Terminal Q2 which receives each bit (Z3* to Z0*) of 4-bit input data Z* is connected to the first input of NAND gate 2001. Overflow carry flag v* from register 19v is supplied to the second input of NAND gate 2002. A flag obtained by inverting the logic level of this flag v* by inverter 2000 is supplied to the second input of NAND gate 2001. Outputs from NAND gates 2001 and 2002 are supplied to NAND gate 2003. An output from NAND gate 2003 is led to output terminal Q3 of circuit block MUX 200.

Circuit block MUX 200 in FIG. 7 operates as follows.

When overflow carry flag v* from register 19v represents "0", NAND gate 2001 becomes "through", and NAND gate 2002 is "closed". Then, the output level of NAND gate 2002 changes to be always level "1", and NAND gate 2003 becomes "through" for a signal from NAND gate 2001. In this case, NAND gates 2001 and 2003 operate as two series inverters. As a result, the input logic level of NAND gate 2001 becomes the same as the output logic level of NAND gate 2003 (Q3=Q2). That is, Z3 to Z0=Z3* to Z0* (or Z**=Z*) holds.

When overflow carry flag v* from register 19v represents "1", NAND gate 2001 is "closed", and NAND gate 2002 becomes "through". Then, the output level of NAND gate 2001 changes to be always level "1", and NAND gate 2003 becomes "through" for a signal from NAND gate 2002. In this case, NAND gates 2002 and 2003 operate as two series inverters. Consequently, the input logic level of NAND gate 2002 becomes the same as the output logic level of NAND gate 2003 (Q3=Q1). That is, Z3 to Z0=s* and Z3* to Z1* (or Z**=right bit shift of Z*) holds.

The case of adding binary data with signs expressed by two's complements which data respectively consist of four bits, e.g., X=0111 (+7 in decimal notation), and Y=0110 (+6 in decimal notation) in the processor of FIG. 1 having the above arrangement will be considered. At this time, inverter 15 outputs one binary data Y (W=Y) without any change, and adder 14 adds X and Y. Carry signal c at this time is assumed to be 0, i.e., no carry is generated. Sum Z of inverter 15 in this case is 1101 (−3 in decimal notation; three right bits "101" represent decimal 3, and one left bit "1" represents "negative"), and the most significant bit m (=Zs) representing sign Zs of sum Z is 1 (representing "negative").

If the most significant bit m is output as sign flag "1" ("negative") without any change, the arithmetic operation result is mistaken for a negative value (in practice, the result is positive because positive values are added). This mistake (arithmetic operation result is incorrect) can be recognized by generating overflow carry flag signal v* (v*=1).

On the above assumption, the input signals of overflow carry detector 17 are a=0, b=0, and m=1. Overflow carry signal v in this case is 1, and becomes valid. Accordingly, inverter 18 outputs an inverted signal (= /Zs=0) of signal m (=Zs=1) as absolute sign s.

In this case, absolute sign s is 0. Storage circuit 19 stores this sign s (=0) together with overflow carry signal v (=1), and outputs them as overflow carry flag v*=1 and absolute flag s*=0. From this (s*=0), sum Z* output from accumulator 16 is determined as a positive value.

In this case, since an overflow carry is generated (v*=1), bit shifter 20 performs the following processing. That is, absolute flag s* (=0) is set as the most significant bit MSB, and output Z* (=1101) from accumulator 16 is set as a bit (on the left side of the bit string) lower than the MSB.

As a consequence, the bits of the whole input signal to bit shifter 20 are shifted to the right to restore correct addition result Z** (=01101; four right bits "1101" represent decimal 13, and one left bit "0" represents "positive"). (Note that the decimal point position shifts to the right by one bit upon the right shift.)

Figure 8:
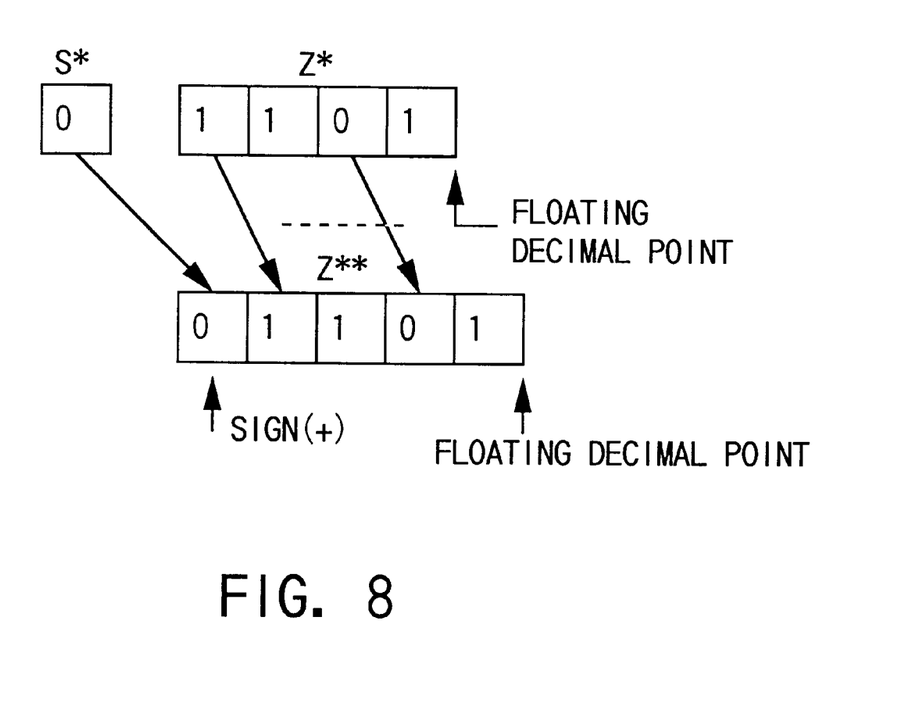
FIG. 8 is a view showing an operation example of right bit shift in bit shifter 20 of FIG. 6.

FIG. 8 schematically shows the manner of the bit shift in bit shifter 20. The case wherein output Z* from accumulator 16 consists of four bits will be described. Assume that sum Z* is "1101", an overflow carry is generated (v*=1), and absolute sign flag s* is 0.

In this case, bit shifter 20 in FIG. 1 (or FIG. 6) receives absolute sign flag s* (=0) and 4-bit sum Z* (=1101). Bit shifter 20 shifts this input signal to the right by one bit to restore correct addition result Z** (=01101).

In this manner, bit shifter 20 shifts only a synthesized signal of absolute sign flag s* (=0) and the bit signal (=01101) of sum Z* to the right by one bit to easily restore the addition result. (That is, a time-consuming operation of changing the sign of the arithmetic operation result into a correct value, and then storing this in a shiftable flag again is eliminated.)

Even when an overflow carry is generated (v*=1), the processor having the arrangement in FIG. 1 can output correct arithmetic operation result Z** and sign flag s* representing a correct sign.

Subtraction of binary data X and Y can be performed by outputting binary data Y from inverter 15 while inverting (W= /Y) the respective bits of data Y, i.e., adding the complement of Y, and X.

Figure 9:
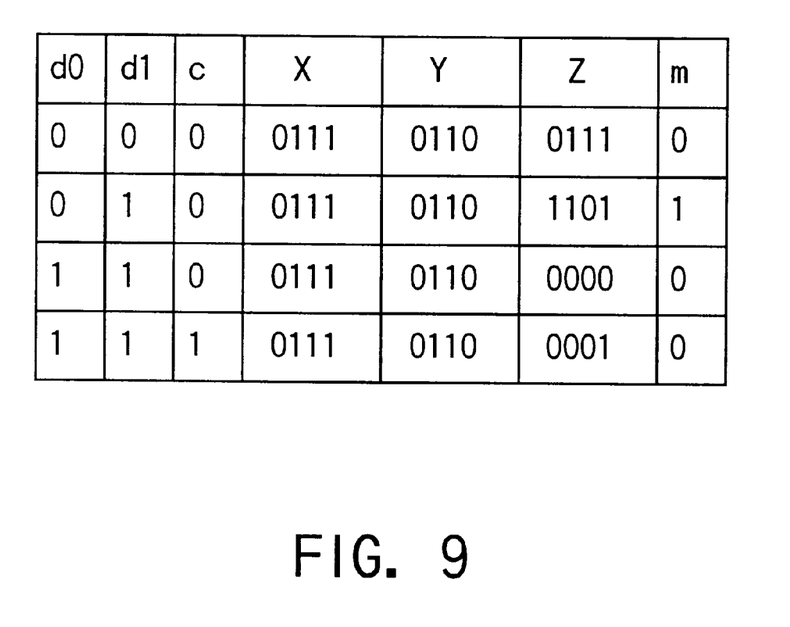
FIG. 9 is a table showing an example of the relationship between outputs (d0, d1, c) from decoder 12, input data (X, Y) to adder 14, and sign bit m (Zs) of the arithmetic operation result (Z) in the arrangement of FIG. 1.

Simple examples of arithmetic operation result Z which is obtained in accordance with the contents of outputs (d0, d1, c) from decoder 12, and data X and Y in the arrangement of FIG. 1 are summarized up in a table of FIG. 9. The above numerical example corresponds to the second row (d0=0, d1=1, c=0, X=0111, Y=0110, Z=1101, m=1) of the table in FIG. 9.

As has been described above, according to the present invention, a processor capable of outputting a sign flag representing a correct sign of the arithmetic operation result even when an overflow carry is generated can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A digital processing system comprising:

arithmetic operation means for adding two binary data respectively having sign bits to output an arithmetic operation result having a sign bit;

overflow carry detection means, connected to said arithmetic operation means, for outputting an overflow carry signal indicating an overflow carry of the arithmetic operation result on the basis of contents of the respective sign bits of the two binary data and the arithmetic operation result; and sign bit output means, connected to said overflow carry detection means, for outputting a sign flag with or without inverting the sign bit of the addition result in accordance with contents of the overflow carry signal.

2. A system according to claim 1, further comprising an overflow carry signal register connected to said sign bit output means to store the overflow carry signal.

3. A system according to claim 2, further comprising a sign flag register connected to said sign bit output means to store the sign flag, and to output stored contents as an absolute sign flag.

4. A system according to claim 3, further comprising an accumulator connected to said arithmetic operation means to store the addition result, and to output stored contents as an arithmetic operation result.

5. A system according to claim 4, further comprising a bit shifter, connected to said sign flag register and said accumulator, for supplying bit shift data having the arithmetic operation result without any change or having the absolute sign flag as the most significant bit and the arithmetic operation result as a lower bit.

6. A system according to claim 5, wherein said bit shifter includes circuit means for generating bit shift data having the absolute sign flag as the most significant bit and the arithmetic operation result as a lower bit when a control input corresponding to the overflow carry signal from said overflow carry detection means indicates an overflow carry state, and for generating bit shift data corresponding to the arithmetic operation result itself when the control input corresponding to the overflow carry signal from said overflow carry detection means does not indicate the overflow carry state.

7. A system according to claim 1, further comprising a sign flag register connected to said sign bit output means to store the sign flag, and to output stored contents as an absolute sign flag.

8. A system according to claim 7, further comprising an accumulator connected to said arithmetic operation means to store the addition result, and to output stored contents as an arithmetic operation result.

9. A system according to claim 8, further comprising a bit shifter, connected to said sign flag register and said accumulator, for supplying bit shift data having the arithmetic operation result without any change or having the absolute sign flag as the most significant bit and the arithmetic operation result as a lower bit.

10. A system according to claim 9, wherein said bit shifter includes circuit means for generating bit shift data having the absolute sign flag as the most significant bit and the arithmetic operation result as a lower bit when a control input corresponding to the overflow carry signal from said overflow carry detection means indicates an overflow carry state, and for generating bit shift data corresponding to the arithmetic operation result itself when the control input corresponding to the overflow carry signal from said overflow carry detection means does not indicate the overflow carry state.

11. A system according to claim 1, wherein said arithmetic operation means includes a program memory storing a predetermined arithmetic operation procedure as a program, and a decoder for reading out the program from said program memory, and decoding contents of the program to generate a decoding result and a carry signal.

12. A system according to claim 11, wherein said arithmetic operation means includes selective inverter means for performing, in accordance with contents of the decoding result from said decoder, any of an operation of outputting one of the binary data without any change, an operation of outputting one of the binary data upon inverting a logic level of one binary data, and an operation of outputting no data.

13. A system according to claim 12, wherein said arithmetic operation means includes an adder which receives the carry signal from said decoder, the other of the binary data, and an output from said selective inverter means, for adding the two binary data.

14. A system according to claim 13, wherein, when "a" represents the sign bit of the other of the binary data, "b" represents a sign bit of an output from said selective inverter means, and "m" represents the sign bit of the addition result from said arithmetic operation means, said overflow carry detection means includes coincidence detection means for detecting a coincidence state "a=b" to generate a coincidence detection result, noncoincidence detection means for detecting a noncoincidence state "b≠m" to generate a noncoincidence detection result, and means, connected to said coincidence detection means and said noncoincidence detection means, for outputting the overflow carry signal when the states "a=b" and "b≠m" are detected.

15. A system according to claim 12, wherein, when "a" represents the sign bit of the other of the binary data, "b" represents a sign bit of an output from said selective inverter means, and "m" represents the sign bit of the addition result from said arithmetic operation means, said overflow carry detection means includes coincidence detection means for detecting a coincidence state "a=b" to generate a coincidence detection result, noncoincidence detection means for detecting a noncoincidence state "b≠m" to generate a noncoincidence detection result, and means, connected to said coincidence detection means and said noncoincidence detection means, for outputting the overflow carry signal when the states "a=b" and "b≠m" are detected.

16. A system according to claim 1, wherein at least one of the two binary data includes binary data expressed by a two's complement.

17. A digital processor comprising:

first means for storing first binary data constituted by a plurality of bits having a first sign bit, and outputting the first binary data;

second means for selectively performing any of a direct output of second binary data and an output of third binary data corresponding to the second binary data, said second binary data being constituted by a plurality of bits having a second sign bit, and said third binary data being obtained by inverting levels of all bits of the second binary data and being constituted by a plurality of bits having a third sign bit corresponding to the second sign bit;

third means for adding the first binary data from said first means and the second binary data from said second means so as to output an addition result constituted by a plurality of bits having a fourth sign bit;

fourth means, connected to said first, second, and third means, for outputting an overflow carry signal indicating an overflow carry of the addition result on the basis of contents of the first, second, and fourth sign bits; and fifth means, connected to said fourth means, for outputting a sign flag with or without inverting the fourth sign bit of the addition result in accordance with contents of the overflow carry signal.

18. A processor according to claim 17, further comprising sixth means, connected to said fifth means, for storing the sign flag, and outputting stored contents as an absolute sign flag.

19. A processor according to claim 18, further comprising seventh means, connected to said third means, for storing the addition result, and outputting stored contents as an arithmetic operation result.

20. A processor according to claim 19, further comprising eighth means, connected to said sixth means and said seventh means, for supplying bit shift data having the arithmetic operation result without any change or having the absolute sign flag as the most significant bit and the arithmetic operation result as a lower bit.

21. A processor according to claim 20, wherein said eighth means includes circuit means for generating bit shift data having the absolute sign flag as the most significant bit and the arithmetic operation result as a lower bit when a control input corresponding to the overflow carry signal from said fourth means indicates an overflow carry state, and for generating bit shift data corresponding to the arithmetic operation result itself when the control input corresponding to the overflow carry signal from said fourth means does not indicate the overflow carry state.

* * * * *